(12) United States Patent
Birru

(10) Patent No.: US 7,764,725 B2
(45) Date of Patent: Jul. 27, 2010

(54) SUB-BANDED ULTRA-WIDEBAND COMMUNICATION SYSTEM

(75) Inventor: Dagnachew Birru, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 1242 days.

(21) Appl. No.: 10/545,717

(22) PCT Filed: Feb. 10, 2004

(86) PCT No.: PCT/IB2004/000350

§ 371 (c)(1),
(2), (4) Date: Aug. 12, 2005

(87) PCT Pub. No.: WO2004/073195

PCT Pub. Date: Aug. 26, 2004

(65) Prior Publication Data

US 2006/0153279 A1    Jul. 13, 2006

Related U.S. Application Data

(60) Provisional application No. 60/447,749, filed on Feb. 14, 2003, provisional application No. 60/478,807, filed on Jun. 16, 2003.

(51) Int. Cl.
 H04B 1/69 (2006.01)
 H04K 1/02 (2006.01)
(52) U.S. Cl. .................. 375/140; 375/146; 375/147; 375/296
(58) Field of Classification Search ............ 375/260, 375/377, 316, 295, 296, 358, 130, 140, 146
See application file for complete search history.

(56) References Cited

U.S. PATENT DOCUMENTS

| 5,677,927 | A |  | 10/1997 | Fullerton |  |
|---|---|---|---|---|---|
| 5,745,480 | A |  | 4/1998 | Behtash et al. |  |
| 6,026,125 | A |  | 2/2000 | Larrick, Jr. et al. |  |
| 6,031,862 | A | * | 2/2000 | Fullerton et al. | 375/146 |
| 6,973,140 | B2 | * | 12/2005 | Hoffman et al. | 375/298 |
| 7,215,698 | B2 | * | 5/2007 | Darby et al. | 375/135 |
| 2002/0172262 | A1 |  | 11/2002 | Sugaya et al. |  |
| 2004/0047285 | A1 | * | 3/2004 | Foerster et al. | 370/210 |
| 2005/0254554 | A1 | * | 11/2005 | Melick et al. | 375/130 |
| 2009/0135950 | A1 | * | 5/2009 | Hoffmann et al. | 375/298 |

FOREIGN PATENT DOCUMENTS

| WO |  | 0139451 | A1 | 5/2001 |
| WO |  | 0143386 | A1 | 6/2001 |
| WO | WO 2004/001998 | A1 | 12/2003 |
| WO | WO 2004/025853 | A2 | 3/2004 |

OTHER PUBLICATIONS

"Residue Number System Assisted Fast Frequency-Hopped Synchronous Ultra-Wideband Spread-Spectrum Multiple-Access: A Design Alternative to Impulse Radio", Yang et al.

* cited by examiner

Primary Examiner—Tesfaldet Bocure

(57) ABSTRACT

A wireless communication system performs high-speed transmission of information signals by using a multi-band approach. Each band spans about 500MHz. A flexible modulation scheme within each band employs time, amplitude and phase modulations, allowing adaptation of the data rate to the sub-band conditions. In addition, pseudo-random frequency sequence is employed to provide sufficient multi-user interference reduction.

16 Claims, 5 Drawing Sheets

SUB-BANDED ULTRA-WIDEBAND COMMUNICATION SYSTEM

CROSS REFERENCE TO RELATED APPLICATION

This application claims the benefit of U.S. Provisional Application Ser. No. 60/447,749 filed Feb. 14, 2003, and Provisional Application Ser. No. 60/478,807 filed Jun. 16, 2003 both of which are incorporated herein by reference.

The present invention relates to high data rate communication systems. More particularly, the present invention relates to a system and method for an Ultra Wide Band (UWB) system for high data rate applications. Most particularly, the present invention relates to a multi-band UWB system modulated to carry multi-megabit per second digital data.

UWB is sometimes referred to as impulse radio or zero-carrier technology. Impulse radio systems are characterized by transmission of pulse trains of short duration and broadband pulses in a relatively low duty cycle typically 10-1000 picoseconds. In some systems these pulses are such that the instantaneous pulse bandwidth is on the order of the center frequency.

Conventional UVB communication systems transmit energy over a much larger bandwidth than narrowband or spread-spectrum systems. It is designed to perform baseband transmission by using pulse train signal having a very narrow pulse width, usually 1ns or less.

Due to its low signal density a UWB implementation is less interfering with other wireless systems and it is expected to be a technique which can overly frequency bands used by prior art wireless communication systems. Further because of its ultra-wide band, UWB is expected to be used for super high-speed wireless transmission on the order of 100 Mbps in personal area networks (PAN). This is especially supported by the FCC's adoption the 3.1-10.6 GHz band for UWB communication and on this basis it is forecasted that millions of UWB-based systems will be in use in the near-term.

For the most part, prior art UWB implementations are directed to low data rate applications with low pulse repetition rates in which the pulse amplitude and inter-pulse distance can be made high. This results in the oft-quoted benefit of UWB, namely, resilience to interference such as multi-path interference. However, future applications require much higher data rates, in the range of 100 Mbs to 500 Mb/s, and the conventional techniques for such systems require high pulse repetition rates, reducing the distance between successive pulses and making the UWB systems prone to multi-path interference.

Therefore, there is a need for a low cost approach to high data rate UWB communications systems that avoids multi-path interference. The system and method of the present invention provides such a UWB communications system that uses a multi-band approach where the span of each band spans is about equal.

Within each band of the present invention, a flexible modulation scheme allows adaptation of the data rate to the sub-band channel conditions. Within each band, time, amplitude and phase modulations are employed. In addition, pseudorandom frequency sequence is employed to provide sufficient multi-user interference reduction.

Figure 4A:
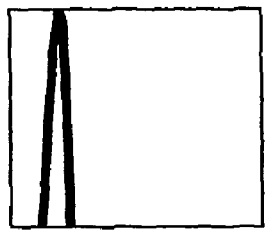
Figure 4B:
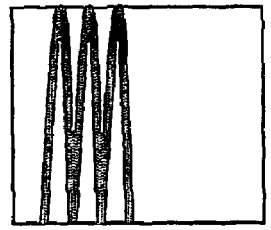
Figure 4C:
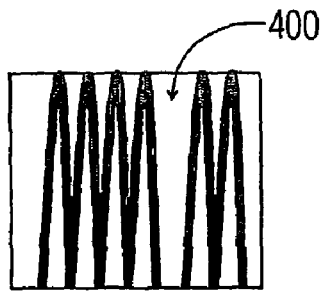
Figure 5:
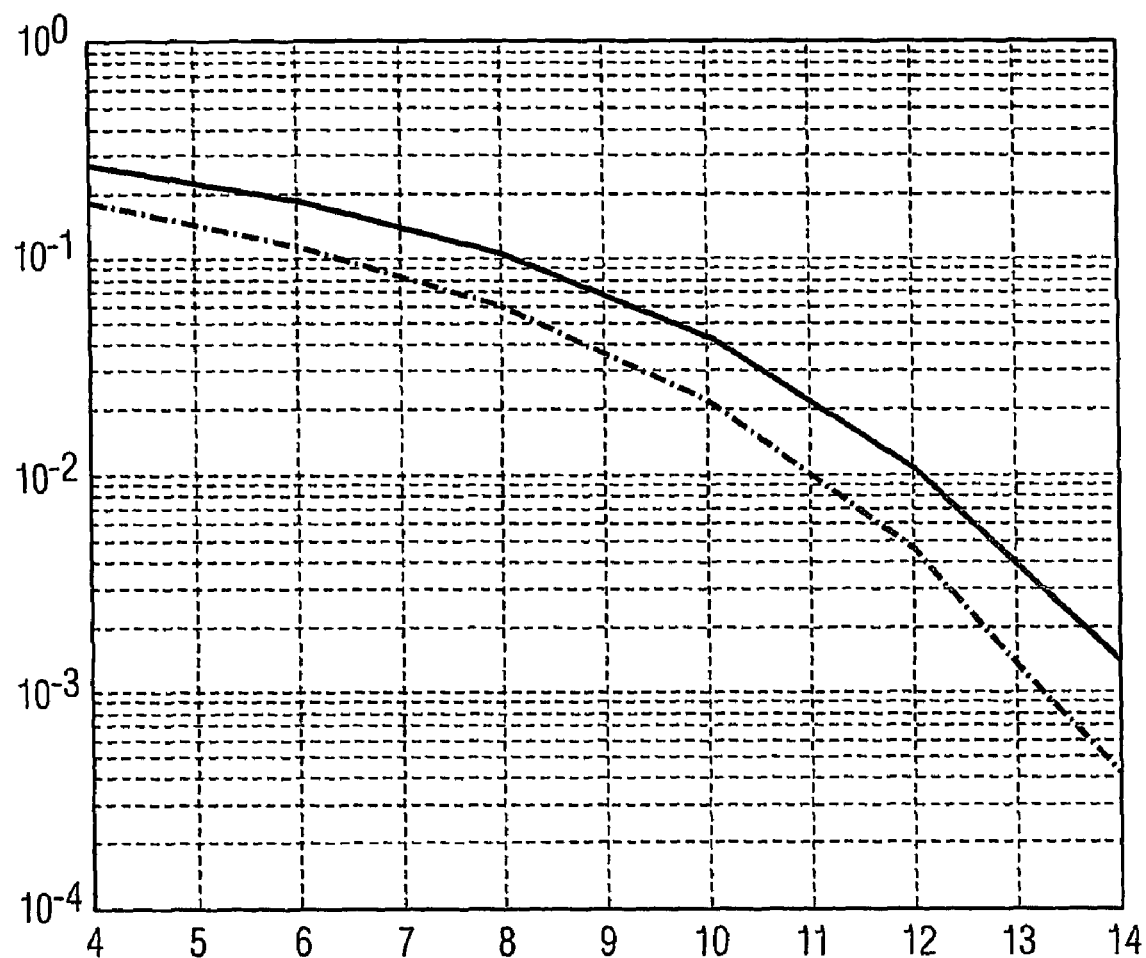

FIG. 4a-c illustrate a frequency domain representation of the multi-band approach; and FIG. 5 illustrates simulation results for a 5-band 120 Mb/s data rate UWB system (8 MH symbol rate).

In the following description, for purposes of explanation and not limitation, specific details such as a particular communication station architecture, wireless network topology and interfaces, simulation results, etc., are set forth in order to provide a thorough understanding of the present invention. However, as will be apparent to one of ordinary skill in the art the present invention may be practiced in other embodiments that depart from these specific details.

Figure 1A:
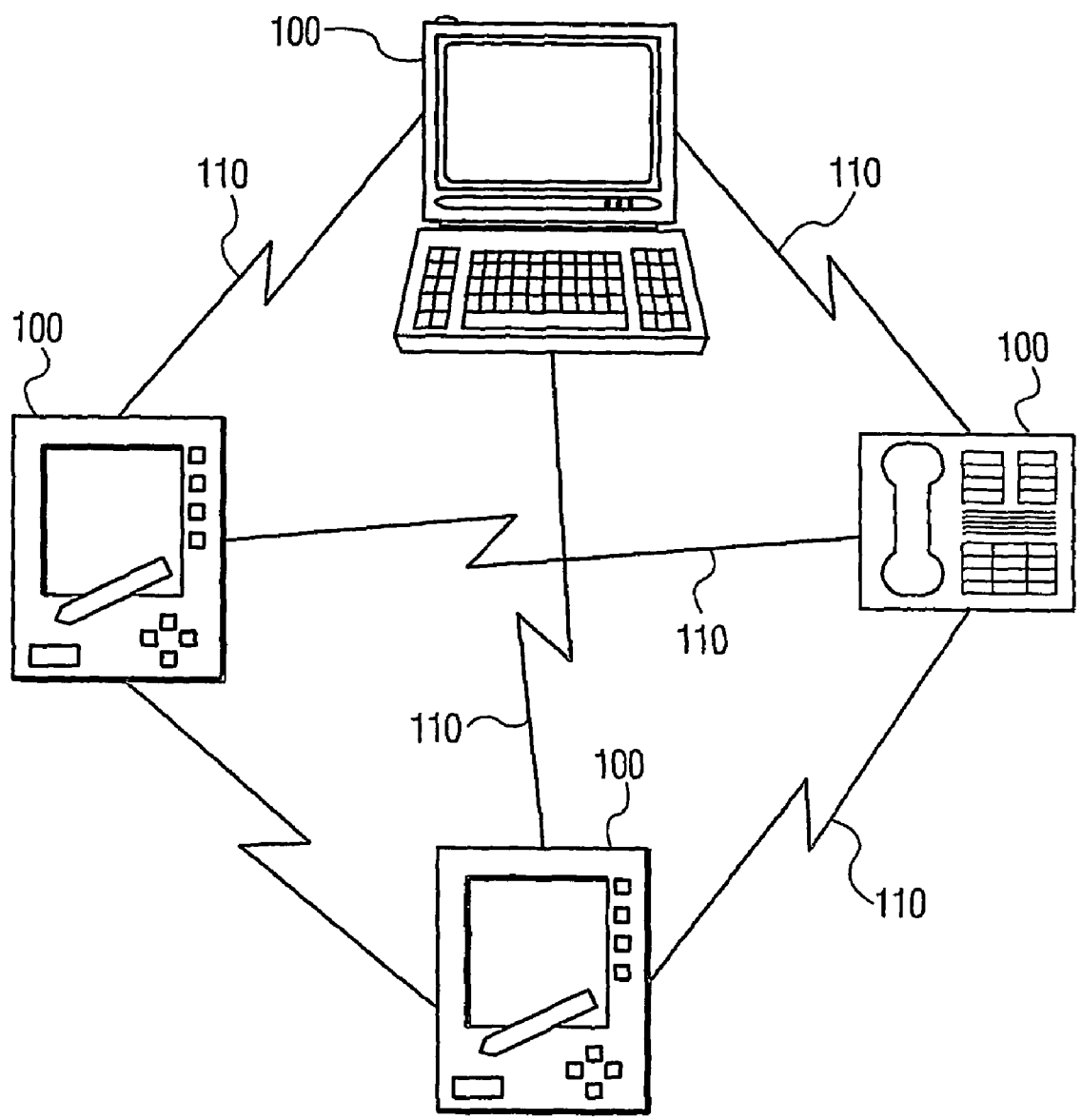
FIG. 1a illustrates a wireless network of communication stations that communicate by peer-to-peer communications only.
Figure 1B:
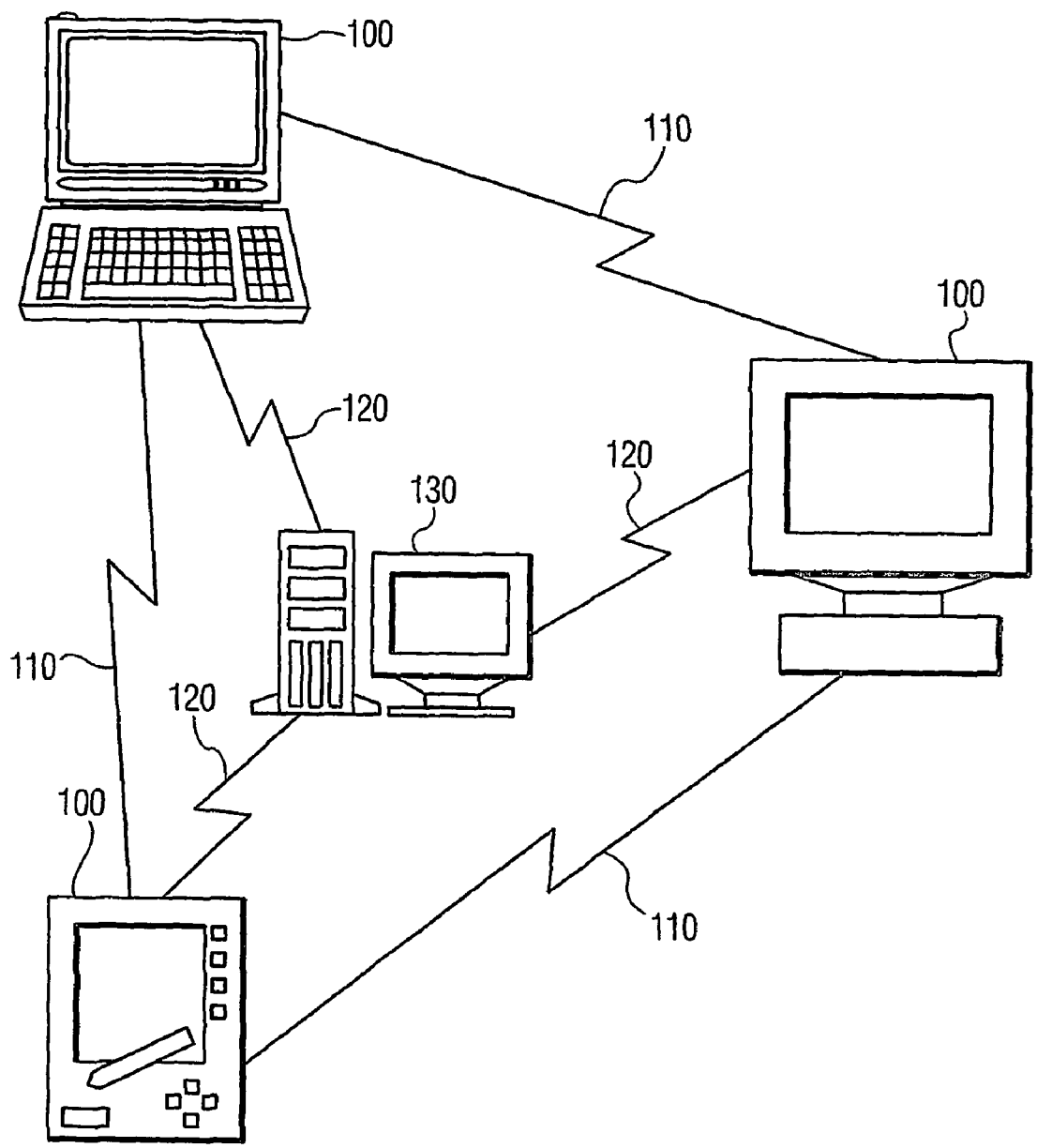
FIG. 1b illustrates a wireless network established and controlled by a control point in which communication stations communicate through the control point as well as on a peer-to-peer basis.

FIG. 1a illustrates a representative wireless ad-hoc UWB pico-net whereto embodiments of the present invention are to be applied. As shown in FIG. 1a, different types of communication units 100 communicate on a peer-to-peer basis only through wireless links 110. FIG. 1b illustrates a representative wireless UWB network whereto embodiments of the present invention are also to be applied. As shown in FIG. 1b, different types of communication units 100 of a pico-net communicate not only on a peer-to-peer basis through wireless links 110 but through wireless links 120 to/from a control point 130 that originally established the pico-net. A key principle of the present invention is to provide a mechanism whereby both types of UWB pico-nets of communication units 100 minimally interfere with one another when they are in proximity with one another.

Figure 2A:
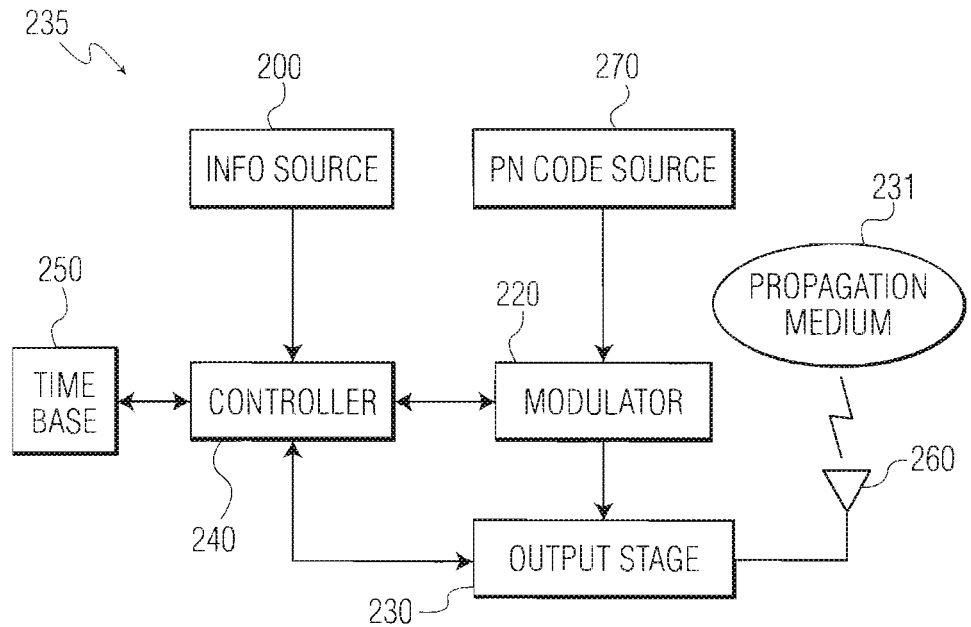
FIG. 2a is a simplified block diagram of an architecture of an exemplary UWB communication station, illustrating the transmitter portion, whereto embodiments of the present invention are to be applied.

Referring now to the transmitter subsystem (235) of FIG. 2a, a wireless communication unit 100 of either of the UWB pico-nets of FIGS. 1a-b may include a transmitter subsystem (235) with an architecture as illustrated in the block diagram of FIG. 2a, whereto embodiments of the present invention are to be applied. As shown in FIG. 2a a communication unit may include an information source 200, a modulator 220, an output stage 230 or transmitter, a controller 240, a time base 250 that provides a periodic timing signal, an antenna 260 and a pseudorandom noise source 270. The controller 240 detects an information signal and then, based on sub-band channel conditions, determines time, amplitude and phase modulations to be employed and indicates the determined modulations to the modulator 220. The exemplary system of FIG. 2a is for description purposes. The UWB output stage 230 is coupled to antenna 260 to transmit desired data via the propagation medium 231. The exemplary system of FIG. 2a is for description purposes and the antenna may be a cable or an integrated circuit configured as an antenna, for example.

Figure 2B:
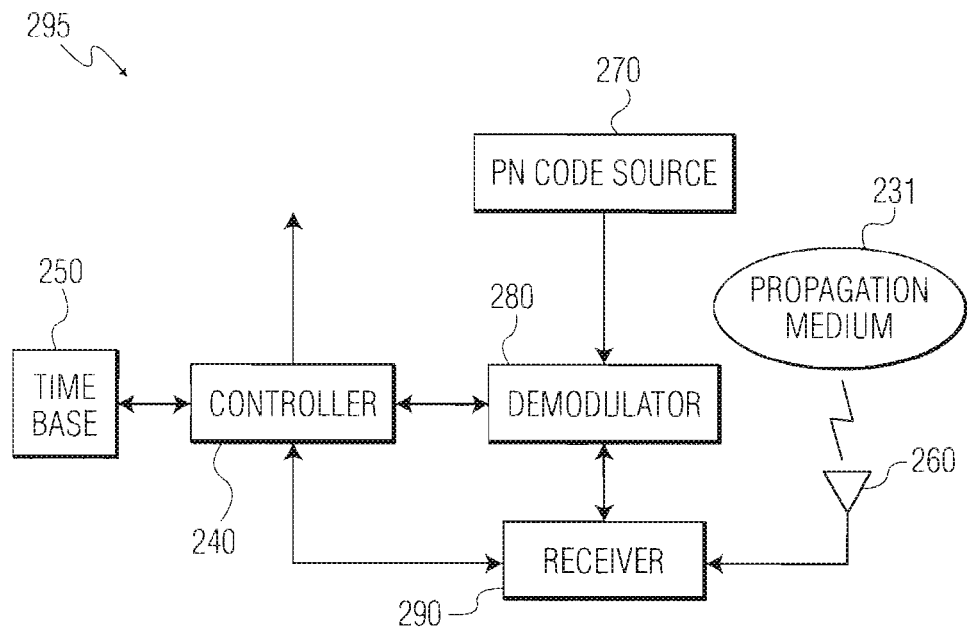
FIG. 2b is a simplified block diagram of an architecture of an exemplary UWB communication station, illustrating the receiver portion, whereto embodiments of the present invention are to be applied.

Referring now to the receiver subsystem (295) of FIG. 2b, a wireless communication unit 100 of the UWB pico-net of FIGS. 1a-b may include a receiver subsystem (295) with a receiver architecture as illustrated in the block diagram of FIG. 2b, whereto embodiments of the present invention are to be applied. As shown in FIG. 2b, an exemplary UWB communication unit may include a demodulator 280, a receiver 290, a controller 240, a time base 250 to provide a periodic timing signal, an antenna 260 and a pseudorandom noise source 270. The antenna 260 is shown coupled to a receiver 290 for receiving a propagated impulse radio signal but other embodiments are possible, e.g., instead of an antenna cable is the propagation medium. The controller 240 detects the receipt of a transmitted signal by the receiver 290, and then, based on sub-band channel conditions, determines time, amplitude and phase modulations that were employed and indicates the determined modulations to the demodulator 280. The exemplary system of FIG. 2b is for description purposes only.

Although the description may refer to terms commonly used in descriptions of particular transceiver systems, the description and concepts presented herein equally apply to other processing systems, including systems having architectures dissimilar to that shown in FIGS. 2a-b. Further, the pico-nets illustrated in FIGS. 1a-b typically may have many more communication units participating in the pico-net and the size illustrated is a simplification for ease of description purposes alone.

Assume that the UWB channel is divided into N bands, and a pulse shape $h(t,l)$ $l=1 \ldots N$, is used for each band. Then, the output of the UWB wireless output stage 230 can be described by $$y(t) = \sum_n a_n h_l(t - nT - c_n \tau, f(n)) + b_n h_l(t - nT - c_n \tau - d_n \tau_{ch}, f(n)) \quad (1.1)$$

where
$a_n$ and $b_n$ are amplitude or phase modulating data,
$c_n$ and $d_n$ are the differential time modulation data,
$f(n)$ is the frequency band component,
$\tau_{ch}$ is a small time unit for channelization purposes or an additional channel to convey data,
$\tau$ is a small time unit for position modulation, and
T is the inter-pulse separation.

Figure 3:
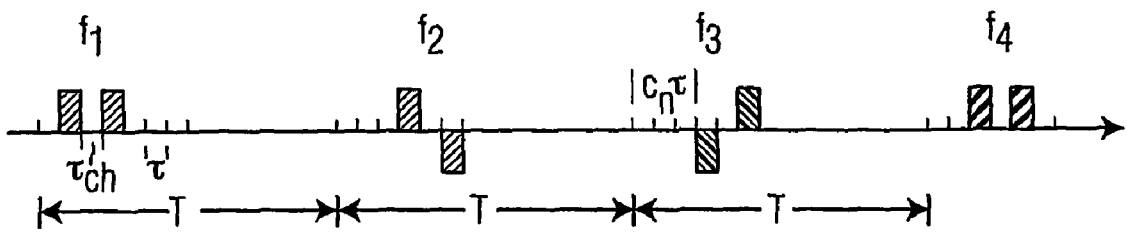
FIG. 3 illustrates a multi-band symbol-position UWB modulation scheme.

A first embodiment, illustrated in FIG. 3, provides a sequence of time/phase modulated pulses. Each pulse is transmitted through a specific band. For example, the first pulse is preferably carried through the 3.2-3.7 GHz band (500 MHz bandwidth) and the subsequent pulses are preferably transmitted in the rest of the bands. In the preferred embodiment illustrated in FIG. 3, two sub-pulses per band are transmitted at a time by the UWB output stage or transmitter 230. In an alternative embodiment, only one sub-pulse per band is transmitted at a time by the UWB output stage or transmitter 230, i.e., $a_n$ or $b_n$ in the equation (1.1) above is set to zero.

In another preferred embodiment, FIGS. 4a-c show the frequency domain representation of the multi-band transmission of a UWB pulse. FIG. 4a illustrates a single band transmission, FIG. 4b illustrates a 3-band transmission and FIG. 4c illustrates a 6-band transmission where one band in-between 400 is skipped. In the time domain, multi-band transmission is carried in a time multiplexed manner in such a way that the inter-pulse separation (T) is maximized. This embodiment allows a better and a lower cost receiver implementation.

An advantage of the present invention is flexibility in trading resources such as bandwidth, data rate, implementation complexity and quality of transmission in each band. In a preferred embodiment, one band carries 20 Mb/s data while the other band carries 30 Mb/s data. Allocation of the data rate per band is based on the requirements of the application and the capacity of the sub-channel.

To further illustrate this flexibility, Table 1 lists embodiments of combinations of resources. The first column shows a 1-band UWB system that carries a 20 Mb/s payload. It uses an 10-Ms/s symbol rate and each symbol carries 2 bits of data, one via amplitude/phase and another via position. The second column shows a 110 Mb/s system using 5 bands. The symbol rate is kept at 10 Ms/s. 30 bits/symbol (3 bits per symbol per channel where 1 bit with phase and 2 bits with position) are transmitted. The other columns also illustrate corresponding preferred embodiments.

Depending on the condition of the channel and the requirements of the application, the bit rate per band can be adjusted conveniently, in a preferred embodiment. For example, in a preferred embodiment, one band may carry 2 bits per symbol while the other carries 4 bits per symbol.

TABLE 1

Resource Configurations For A Given Data Rate

|  | Data rate | | | |
| --- | --- | --- | --- | --- |
|  | 20 Mb/s | 110 Mb/s | 200 Mb/s | 480 Mb/s |
| Number of bands | 1 | 5 | 6 | 8 |
| modulation | (1)DPSK + 1(SPM) | 1(DPSK) + 2(SPM) | 2(BPSK) + 2(SPM) | 2(BPSK) + 4(SPM) |
| Symbol rate/band | 10 Ms/s | 10 Ms/s | 10 Ms/s | 20 Ms/s |
| Raw bit rate | 20 Mb/s | 150 Mb/s | 240 Mb/s | 640 Mb/s |
| Symbol interval | 100 ns | 100 ns | 100 ns | 50 ns |
| T | 100 ns | 20 ns | 16 ns | 6.5 ns |

The embodiments in Table 1 illustrate a low symbol rate system per band. Such a low symbol rate system enables the design of a transceiver system that is resilient to multipath interference.

By way of example and not limitation, FIG. 5 plots simulation results for an implementation of a 5-band 120 Mb/s UWB system. The position part carries 2 bits per band/symbol and the amplitude part carries 1 bit per band/symbol. The time step for the position part is 2.5 ns. Bandwidth for each pulse is approx 500 MHz. As shown, the position portion performance is slightly worse than the amplitude portion.

The invention may be embodied in other specific forms without departing from the spirit or essential characteristics thereof. The provided embodiments are by way of example only, and are not provided in any limiting sense. The scope of the invention is indicated by the appended claims rather than by the foregoing description and all modifications coming within the meaning and range of equivalency of the claims are therefore intended to be included therein.

What is claimed is:

1. A method for transmitting data using ultra-wideband techniques, said method comprising the steps of:
    (a) providing a transmitter subsystem configured to perform the steps of—
    (a.1) providing a UWB channel as a series of UWB signal pulses,
    (a.2) dividing the UWB channel into N bands,
    (a.3) transmitting each pulse of said series through a band of said N divided bands, and
    (a.4) modulating said series of UWB pulses by selectively using at least one modulation technique from the group consisting of time/phase, frequency, and amplitude, said selection being based on sub-band channel conditions; and
    (b) providing a receiver subsystem configured to perform the steps of—
    (b.1) receiving a UWB signal divided into N bands,
    (b.2) combining the N bands into a UWB channel, and (b.3) deriving a series of UWB pulses from the combined N bands.

2. The method as claimed in claim 1, wherein said dividing step (a.2) further comprises the step of:
(a.2.1) dividing said UWB channel such that the span of each band is about equal.

3. The method as claimed in claim 1, wherein said modulating step (c) further comprises the step of:
(a.4.1) employing a pseudo-random noise frequency sequence to provide sufficient multi-user interference reduction.

4. The method as claimed in claim 1, wherein said transmitting step (a.3) further comprises the steps of:
(a.3.1) transmitting the provided a first pulse of the series through a 3.2 to 3.7 GHz band of said N bands; and
(a.3.2) transmitting any pulse other than said first pulse of the series in non-first band of said N bands.

5. The method as claimed in claim 1, wherein said method further comprises the step of:
(a.5) carrying the multi-band transmission in a time multiplexed manner such that an inter-pulse separation is maximized.

6. The method as claimed in claim 1, wherein when N=2, said method further comprises the steps of:
(a.6) carrying 20 Mb/s by a first band; and
(a.7) carrying 30 Mb/s by a second band.

7. A method for transmitting data using ultra-wideband techniques, said method comprising the steps of:
(a) providing a transmitter subsystem configured to perform the steps of—
(a.1) providing a UWB channel as a series of UWB signal pulses,
(a.2) dividing the UWB channel into N bands,
(a.3) transmitting each pulse of said series through a band of said N divided bands, and
(a.4) modulating said series of UWB pulses by selectively using at least one modulation technique from the group consisting of time/phase, frequency, and amplitude, said selection being based on sub-band channel conditions; and
(b) providing a receiver subsystem configured to perform the steps of—
(b.1) receiving a UWB signal divided into N bands,
(b.2) combining the N bands into a UWB channel, and
(b.3) deriving a series of UWB pulses from the combined N bands,
wherein when N>3, said transmitting step (a.3) optionally further comprises the step of:
(a.3.3) skipping at least one in-between band of said N bands.

8. A method for transmitting data using ultra-wideband techniques, said method comprising the steps of:
(a) providing a transmitter subsystem configured to perform the steps of—
(a.1) providing a UWB channel as a series of UWB signal pulses,
(a.2) dividing the UWB channel into N bands,
(a.3) transmitting each pulse of said series through a band of said N divided bands,
(a.4) modulating said series of UWB pulses by selectively using at least one modulation technique from the group consisting of time/phase, frequency, and amplitude, said selection being based on sub-band channel conditions,
(a.8) allocating data rate per band based on at least one of requirements of an application and capacity of a sub-channel, and
(a.11) allocating a resource based on requirements of an application, wherein the resource is at least one of number of bands, modulations, symbol rate/band, raw bit rate, symbol interval, and inter-pulse separation; and
(b) providing a receiver subsystem configured to perform the steps of—
(b.1) receiving a UWB signal divided into N bands,
(b.2) combining the N bands into a UWB channel, and
(b.3) deriving a series of UWB pulses from the combined N bands.

9. The method as claimed in claim 8, wherein said method further comprises the steps of:
(a.9) carrying by a first band of said N bands of 2 bits per symbol;
(a.10) carrying by a second band of said N bands of 4 bits per symbol.

10. The method as claimed in claim 8, wherein said method further comprises the step of:
(a.12) allocating n bits per symbol per channel, wherein m are carried via position and n-m are carried via amplitude/phase.

11. An apparatus for a multi-band ultra-wideband (UWB) communication system, comprising:
a transmitter subsystem comprising—
a controller configured to divide a UWB channel into N bands, and to detect sub-band channel conditions,
a modulator for modulating a series of UWB signal pulses to provide a sequence of modulated pulses, said modulator selectively modulating said series of UWB pulses using at least one modulation technique from the group consisting of time/phase, frequency, and amplitude, said selection being based on the detected sub-band channel conditions, and
a transmitter configured transmits each modulated pulse through one of said N bands; and
a receiver subsystem comprising—
a receiver configured to receive UWB signals transmitted through said N bands,
a controller configured to combine into a sequence of modulated pulses the signals received, and
a demodulator configured to demodulate the sequence of modulated pulses.

12. The apparatus as claimed in claim 11, wherein:
said transmitter further comprises means for sending selected from the group consisting of an antenna, a cable, and an integrated circuit (IC) functioning as an antenna; and
said receiver further comprises means for receiving selected from the group consisting of an antenna, a cable, and an integrated circuit (IC) functioning as an antenna.

13. The apparatus as claimed in claim 11, wherein the span of each of said N bands is about equal.

14. The apparatus as claimed in claim 11, wherein said apparatus further comprises:
a pseudorandom frequency sequence source coupled to an input of said modulator to provide sufficient multi-user interference reduction.

15. An apparatus for a multi-band ultra-wideband (UWB) communication system, comprising:
a transmitter subsystem comprising—
a controller configured to divide a UWB channel into N bands,
a modulator for modulating a series of UWB signal pulses to provide a sequence of modulated pulses, and
a transmitter configured transmits each modulated pulse through one of said N bands; and a receiver subsystem comprising—
a receiver configured to receive UWB signals transmitted through said N bands,
a controller configured to combine into a sequence of modulated pulses the signals received, and
a demodulator configured to demodulate the sequence of modulated pulses, wherein the output of the transmitter is described by the equation $$y(t) = \sum_n a_n h_i(t - nT - c_n \tau, f(n)) + b_n h_i(t - nT - c_n \tau - d_n \tau_{ch}, f(n))$$

where
$a_n$ and $b_n$ are an amplitude or phase modulating data,
$c_n$ and $d_n$ are a differential time modulation data,
$f(n)$ is a frequency band component,
$\tau_{ch}$ is a small time unit for channelization purposes or an additional channel to convey data,
$\tau$ is a small time unit for position modulation, and
T is an inter-pulse separation.

16. The apparatus as claimed in claim 15, wherein the multi-band transmission is carried in a time multiplexed manner such that the inter-pulse separation T is maximized.

* * * * *